United States Patent [19]

Tsukishima

[11] Patent Number: 5,579,382
[45] Date of Patent: Nov. 26, 1996

[54] INTERNATIONAL DIRECT DIALING BOOKING SYSTEM

[75] Inventor: Kensuke Tsukishima, Tokyo, Japan

[73] Assignee: Kokusai Denshin Denwa Kabushiki Kaisha, Japan

[21] Appl. No.: 388,297

[22] Filed: Feb. 14, 1995

[30] Foreign Application Priority Data

Feb. 28, 1994 [JP] Japan .................................. 6-052630
Feb. 28, 1994 [JP] Japan .................................. 6-052636

[51] Int. Cl.⁶ .......................... H04M 3/42; H04M 1/64; H04M 7/00
[52] U.S. Cl. ............................. 379/209; 379/88; 379/201; 379/207; 379/219
[58] Field of Search .................................. 379/201, 207, 379/209, 219, 220, 221, 211, 214, 216, 355, 356, 67, 88, 89

[56] References Cited

U.S. PATENT DOCUMENTS

| | | | |
|---|---|---|---|
| 4,475,009 | 10/1984 | Rais et al. ................................. | 379/211 |
| 4,969,185 | 11/1990 | Dorst et al. ............................... | 379/209 |
| 5,311,583 | 5/1994 | Friedes et al. ........................ | 379/207 X |

*Primary Examiner*—Thomas W. Brown
*Assistant Examiner*—Harry S. Hong
*Attorney, Agent, or Firm*—Westman, Champlin & Kelly, P.A.

[57] ABSTRACT

The international direct dialing booking system of the present invention enables the circuit between a calling party and the other party to be connected by calling the other party on behalf of the calling party and calling back the calling party if the circuit with the other party is not connected in an international direct dialing for the reason that the circuit is busy, or the other party is talking with another person on the telephone or makes no response. In addition, the international direct dialing booking system enables the booking of an international telephone call by the use of an international direct dialing.

4 Claims, 14 Drawing Sheets

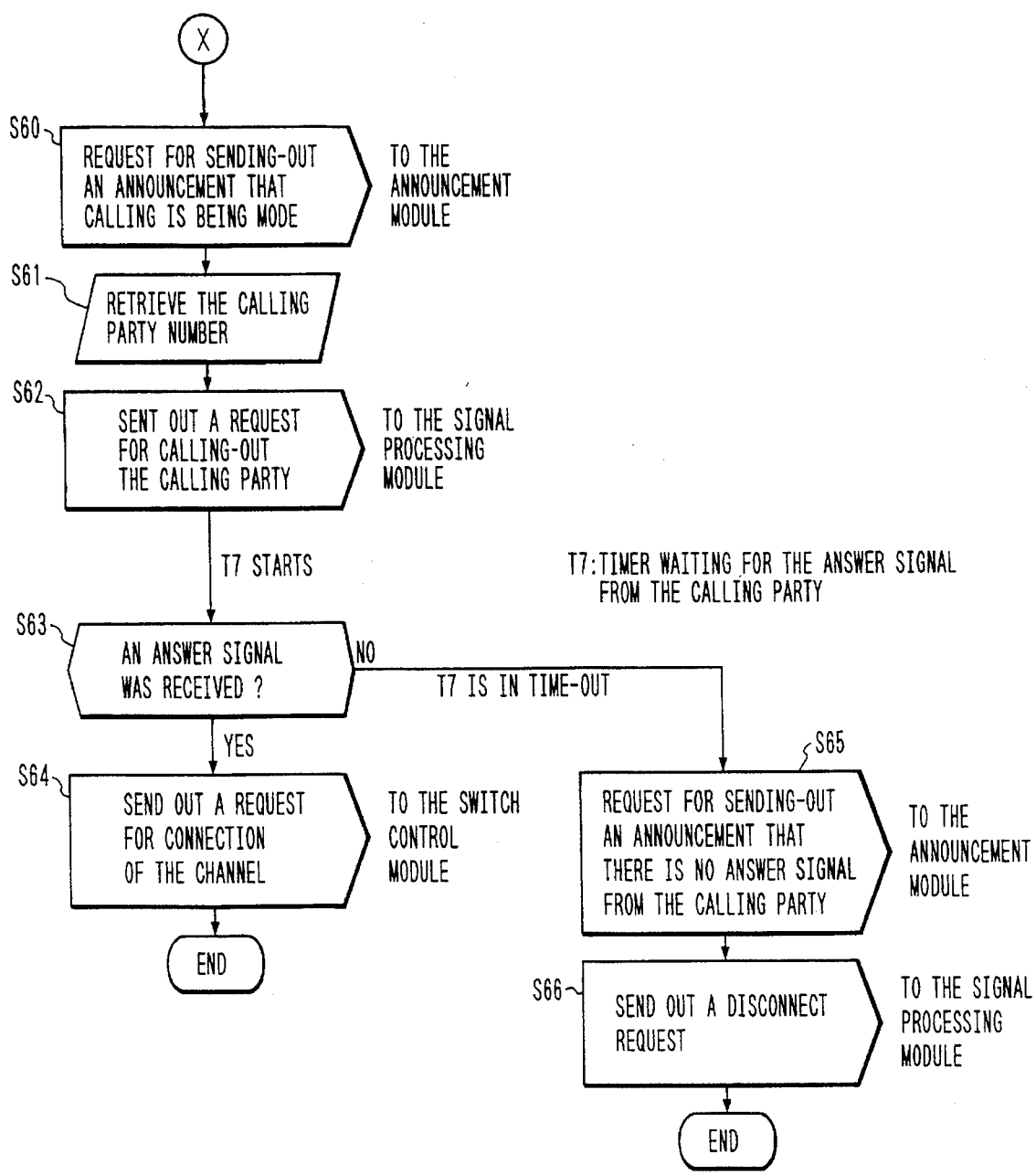

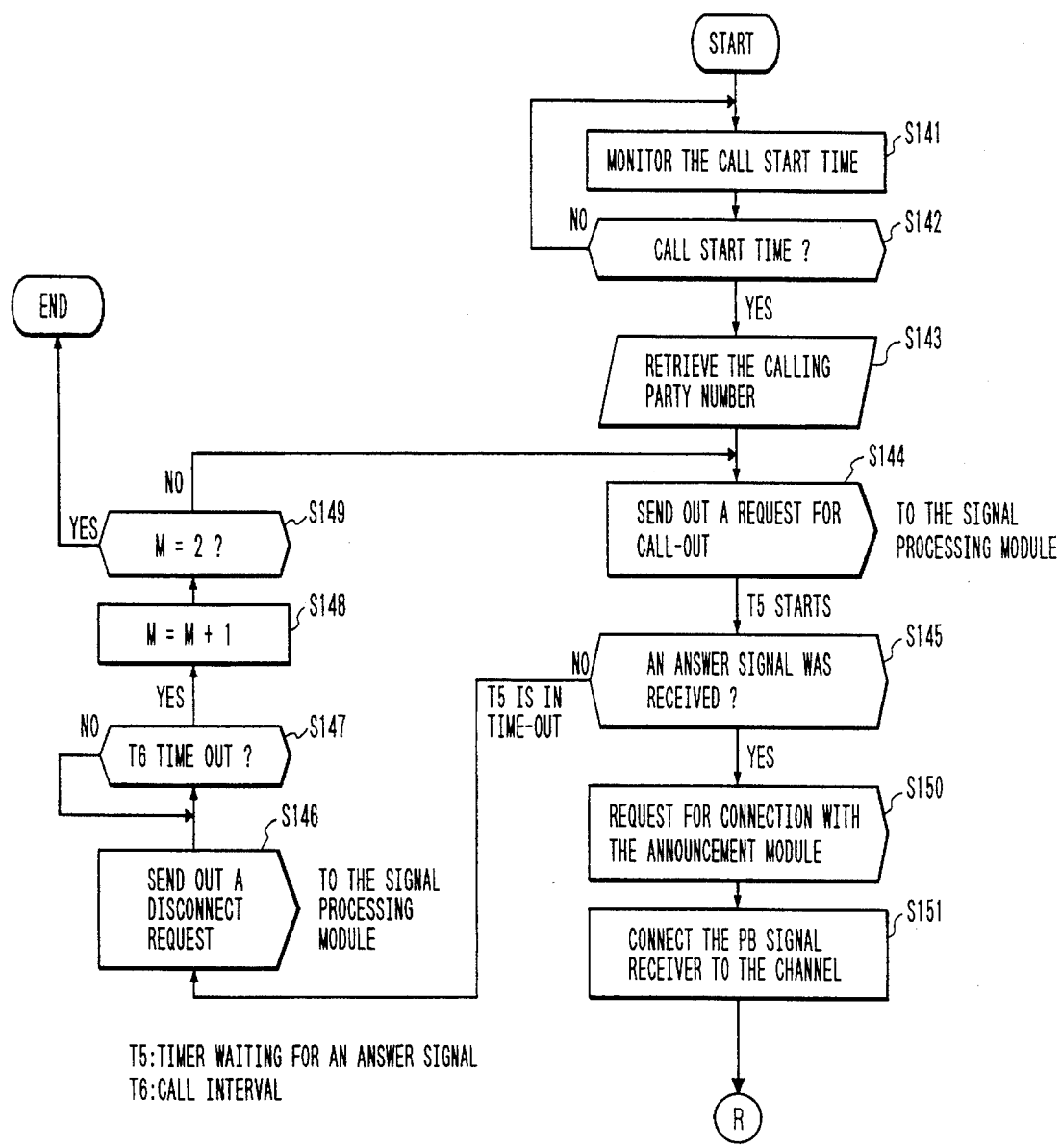

INTERNATIONAL DIRECT DIALING BOOKING SYSTEM

BACKGROUND OF THE INVENTION

1. Field of the Invention

The present invention is related to an international direct dialing booking system, and particularly to an international direct dialing booking system in which, if the circuit is busy, or the called party is talking with another person on the telephone or makes no response when a user performs an international dialing, then the user is enabled to speak with the called party or the other party by calling the called party or the other party on behalf of the user. Also, the present invention is related to an international direct dialing booking system in which a customer can reserve an international telephone call so that he can make an overseas phone call by an international direct dialing at any time he hopes.

2. Description of the Prior Art

Conventionally, in an international operator telephone call in which there is an operator intervention, a service has been provided in which, when the circuit with the called party is not connected for the reason that the circuit is busy, or the called party is talking with another person on the telephone or does not respond (hereinafter, referred to as unsuccessful circuit connection), the system stores a toll ticket on which the information on the call is written, at the request of the user, and distributes the toll ticket to the switchboard at arbitrary rime intervals, and the operator calls the called party and calls back the user when the circuit busy condition is dissolved.

However, in the international direct dialing, at the time of unsuccessful circuit connection, the customer temporarily ends his call-out action and repeats the call-out action by himself.

Accordingly, the international direct dialing has a problem that, at the time of unsuccessful circuit connection, the user has to temporarily stop his call-out action and repeat the call-out action by himself, and thus the time and labor taken by the user to call out increase and he feels mental uncomfortableness.

Further, in the international telephone call, it is usually required to call the other party in consideration of time difference. However, in the traditional international direct dialing, the user himself must consider such time difference to dial at a proper time. This also causes a problem that the user needs to consider time difference each time he calls out, which results in increase in the user's labor and is cumbersome. In addition, there is a problem that the user may forget to call if he tries to call several hours later in consideration of the time difference. Conversely, there is also a problem that, if he makes an international telephone call without considering the time difference, the probability that the other party will respond becomes small and ineffective calls increase, which leads to the increase of the waste of the circuit.

SUMMARY OF THE INVENTION

It is an object of the present invention to eliminate the above problems of the prior art and provide an international direct dialing booking system in which, when a user makes an international direct dialing and if the circuit is not connected with the other party for the reason that the circuit is busy, or the other party is talking with another person on the telephone or makes no response, the circuit between the calling party and the other party can be connected by calling the other party on behalf of the calling party to call back the calling party.

It is a further object of the present invention to provide an international direct dialing booking system which enables the booking of an international telephone call by means of the international direct dialing.

To accomplish the above objects, the present invention is characterized by comprising a means for connecting a channel to the called party specified by the international direct dialing made by a calling party when the international direct dialing is called in, a PB signal receiver connected to the channel, a means for performing a booking procedure when the PB signal receiver receives a predetermined PB signal from the calling party, a means for calling the called party at the call time registered by the booking procedure, and a means for calling the calling party when there is an answer signal from the called party.

In accordance with the present invention, when the calling party calls in and the connection to the called party is not successful, the means for performing a booking procedure starts up at the request of the calling party. Then, the call start time, the call-back method instructed by the calling party are accepted. Thereafter, at the call start time, the called party is called, and an operation for calling the calling party is performed upon the receipt of the response from the called party.

Further, the present invention is also characterized by comprising a means for performing a booking procedure when there is a call-in of an access number for booking by the international direct dialing made by a calling party and a predetermined PB signal is received from the calling party, and a means for calling the calling party at the call time registered by the booking procedure.

In accordance with the present invention, if the calling party previously performs a booking procedure in consideration of the time difference of the other party, the operation of calling the calling party is executed at the reserved call time. If the calling party responds, the operation of calling the called party is subsequently carried out. For this, the calling party need not input the telephone number of the called party, and can easily and surely communicate with the called party.

BRIEF DESCRIPTION OF THE DRAWING

FIGS. 7 and 8 are flowcharts showing the operation when the call start time is reached in the international direct dialing booking service.

FIGS. 17 and 18 are flowcharts showing the operation of calling the calling and called parties.

DETAILED DESCRIPTION OF THE PREFERRED EMBODIMENT

Figure 2:
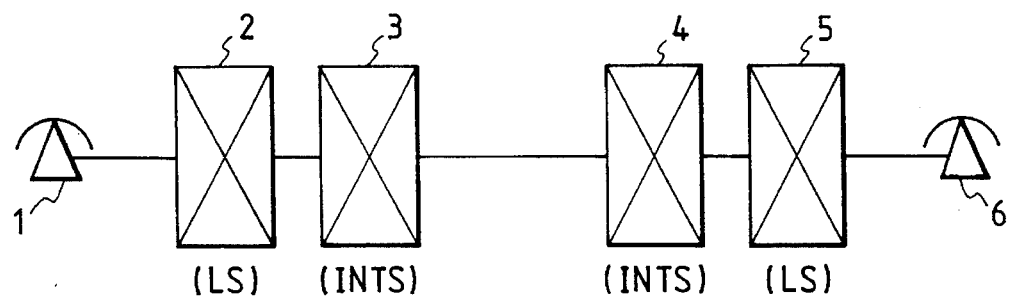
FIG. 2 is a diagram schematically showing the communication path of the international telephone.
Figure 3:
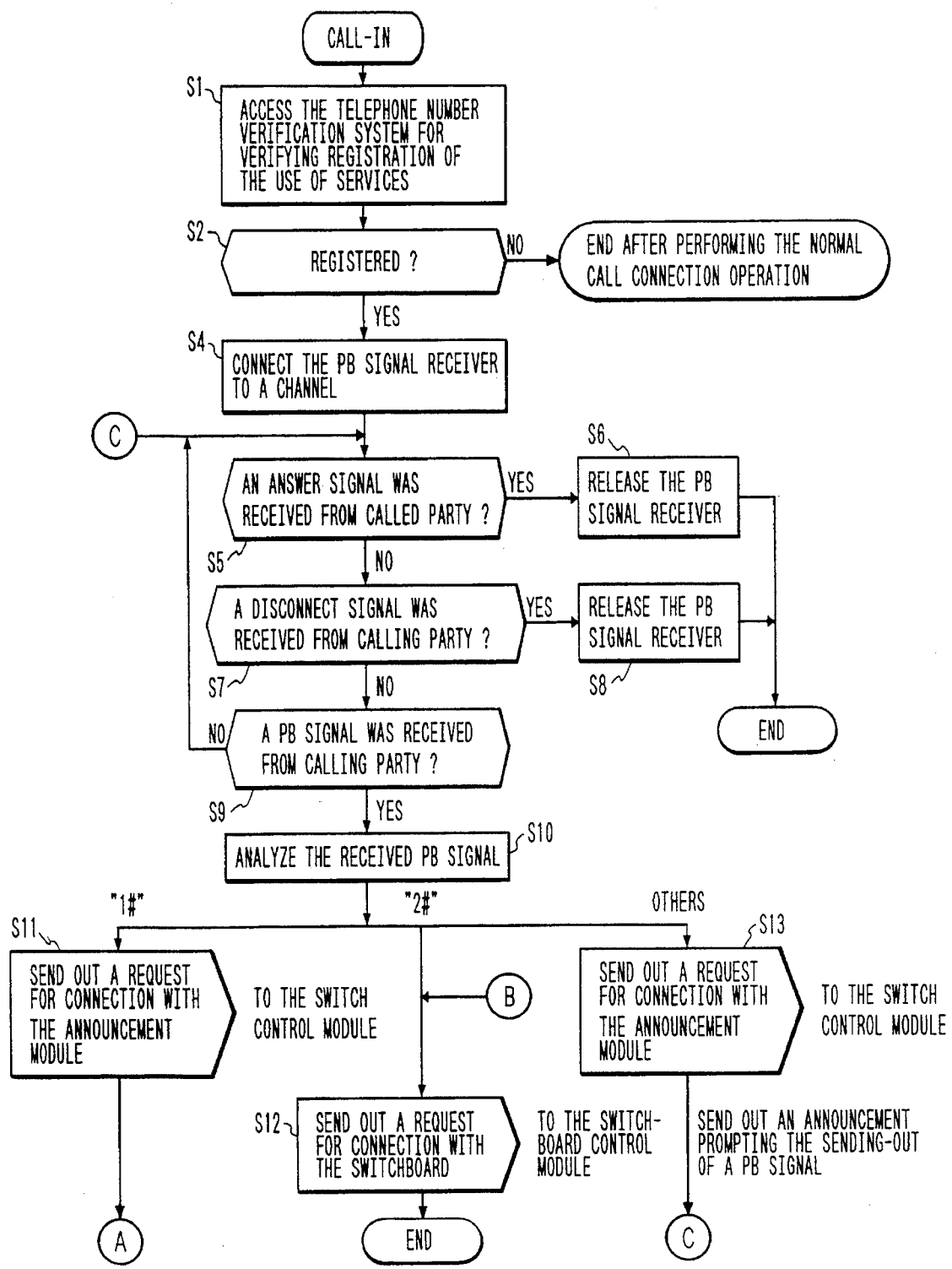
FIGS. 3 to 6 are flowcharts showing the operation of the international direct dialing booking service.
Figure 4:
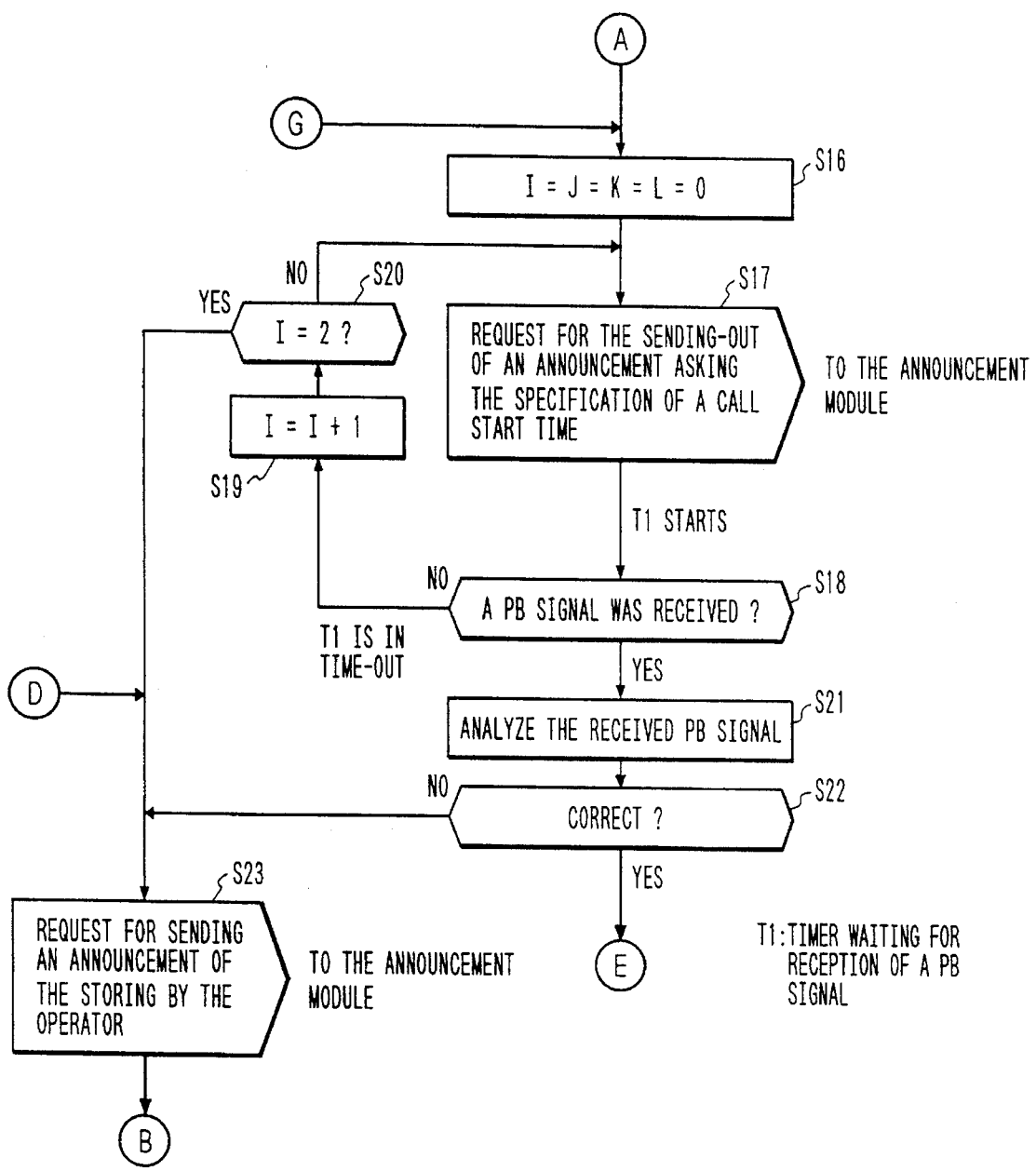

Now, the present invention is described in detail with reference to the drawings. FIG. 2 is a conceptual view showing the path for the international direct dialing. For instance, if a call-out is made from a telephone 1 in Japan to a telephone 6 in a foreign country (for instance, U.S.A.) by an international direct dialing, this call is connected to an international transit switch (INTS) 3 through a local switch (LS) 2 in Japan, and also connected to a telephone 6 in the foreign country through an international transit switch (INTS) 4 and a local switch (LS) 5 in the foreign country.

Figure 1:
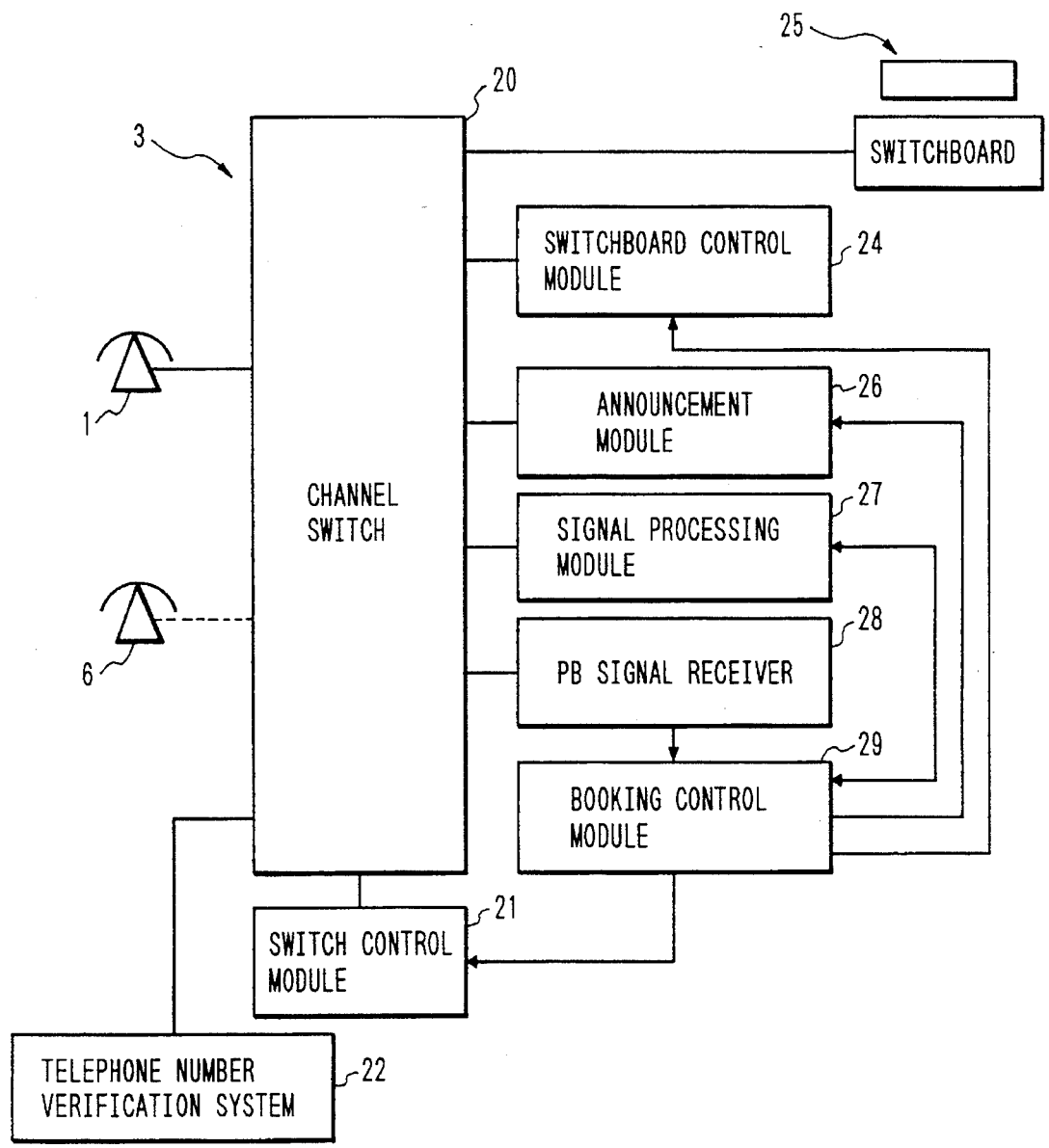
FIG. 1 is a block diagram showing the schematic construction of an embodiment of the present invention.

FIG. 1 is a block diagram showing the schematic construction of the international transit switch 3. Incidentally, in FIG. 1, only the construction related to the present invention is shown, and the construction which is not related to the present invention is omitted.

In FIG. 1, a channel switch 20 connects the telephone 1 and a switchboard 25, an announcement module 26 or a PB signal receiver 28 as instructed by a switch control module 21. A telephone number verification system 22 is to verify whether or not a subscriber registered the utilization of various services by the telephone number of the subscriber. A switchboard control module 24 connects the telephone 1 and the switchboard 25, and controls the operation of the switchboard 25. A signal processing module 27 performs the connection to a calling party and the like. In addition, a booking control module 29 carries out the necessary processings for the booking desired by the calling party.

The operation of an embodiment of the present invention is described below with reference to the flowcharts of FIGS. 3 to 6.

When an international direct dialing is called in from the telephone 1 through the local switchboard 2, the telephone number verification system 22 is accessed, in step S1, to verify whether or not the subscriber registered the utilization of various services. If it is determined in step S2 that there is no registration, a normal connective operation to simply connect the circuit with the called party is performed and the process ends.

If the determination in step S2 is positive, the process goes to step S4, where the PB signal receiver 28 is connected to the channel and a call connective operation is performed. In step S5, it is determined whether or not there is an answer signal from the called party, and if so, the process goes to step S6, where the PB signal receiver 28 is released from the channel, the circuit between the calling and called parties is connected, and the process ends.

If the determination in step S5 is negative, the process goes to step S7 where it is determined whether or not a disconnect signal was received from the calling party. If this determination is positive, step S8 is entered where the PB signal receiver 28 is released from the channel, the circuit with the calling party is disconnected, and the process ends. If the determination in step S7 is negative, the process flows to step S9 where it is determined whether or not the PB signal from the calling party is received. This determination is performed by the PB signal receiver 28. As long as this determination is negative, the process returns to step S5 to repeat the determinations in steps S5 and S7.

Incidentally, between the steps S7 and S9, a procedure may be inserted in which the determination of the elapse of, for instance, 30 seconds, is made, and if 30 seconds elapsed, the announcement module 26 is connected to the telephone 1 and an announcement "please input a PB signal." is made. In this case, the circuit to the called party is disconnected when the announcement is made.

If the determination in step S9 becomes positive, the flow advances to step S10 where the PB signal received at the PB signal receiver 28 is analyzed. The result of the analysis is sent to the booking control module 29. If the PB signal is "1#" for instance, the process goes to step S11, where the booking control module 29 requests the switch control module 21 to connect the announcement module 26 to the channel. Then, the booking control module 29 requests the announcement module 26 to make an announcement, for instance, "Automatic booking service will be entered, and please input as instructed." Thereafter, the process goes to step S16 in FIG. 4.

On the other hand, if the PB signal is, for instance, "2#", the process goes to step S12, where the booking control module 29 sends to the switchboard control module 24 a request to connect the telephone 1 with the switchboard 25. Further, if the result of the PB signal analysis in step S10 indicates other PB signal, the process goes to step S13, where the booking control module 29 requests the switch control module 21 to connect the announcement module 26 to the channel, and requests the announcement module 26 to make an announcement to the calling party to the effect that a correct PB signal should be input. Thereafter, the process returns to step S5 to repeat the above operations.

When the process advances to step S16, the stored numbers I, J, K, and L, for instance, in a certain register in the booking control module 29 are set to zero. In step S17, the announcement module 26 makes an announcement to the telephone 1 for requesting a call time to be specified. Then, a timer T1, which is in the booking control module 29 or connected to the module 29, is started, and the process goes to step S18 to determine whether or not a PB signal was received. If a PB signal was received, the process goes to step S21, and if no PB signal was received even in the case of time-out of the timer T1, the process goes to step S19 to increase the stored number I by one. In step S20, it is determined whether or not I=2, and if the determination is negative, the process goes to step S17 to make again the announcement for requesting a call time to be specified. If the determination in step S20 is positive, step S23 is entered, where an announcement is made, for instance, to the effect that a connection with the switchboard will be made for operator storing, as described above.

Figure 5:
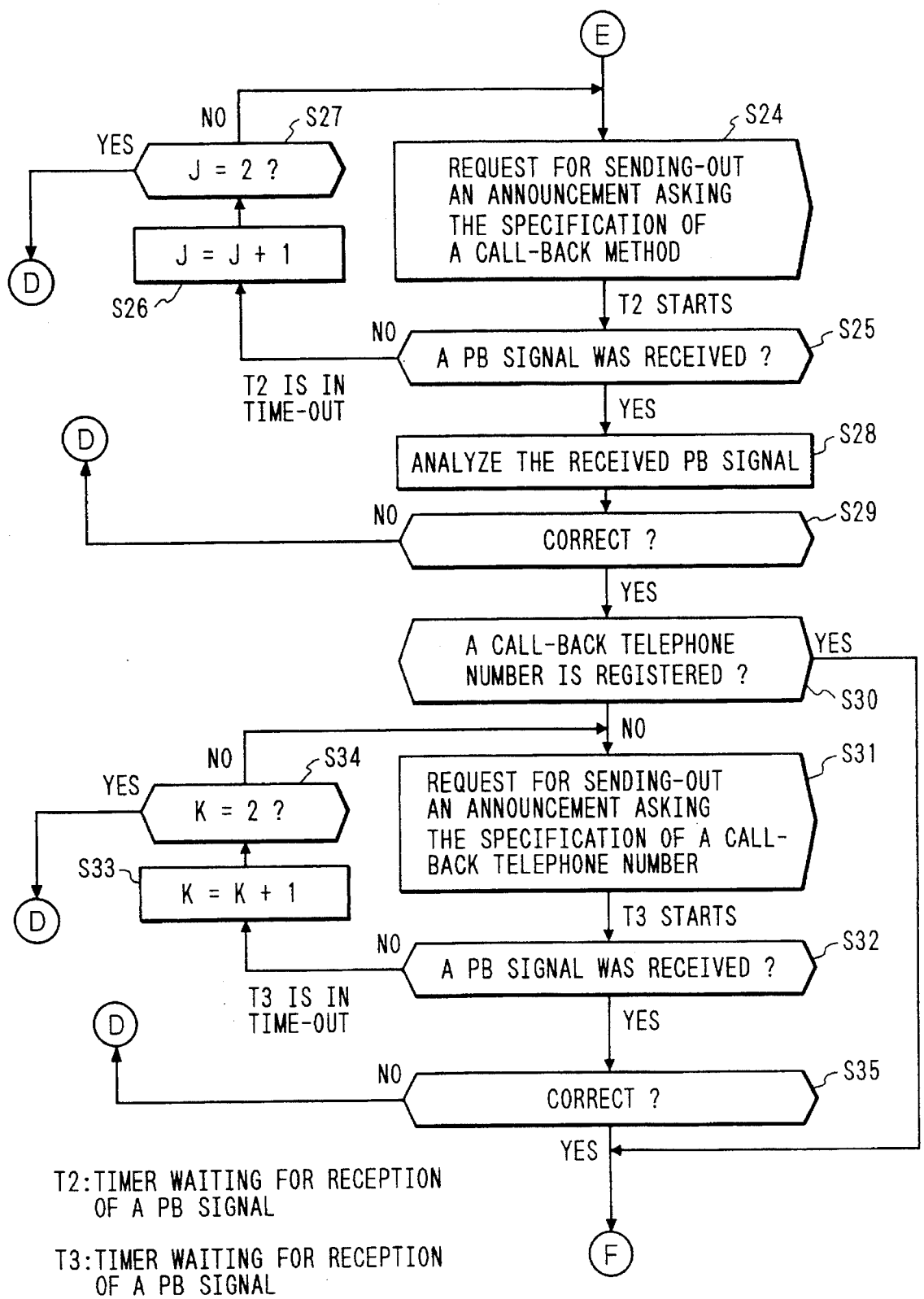

In step S21, the received PB signal is analyzed, and if it is determined to be normal in step S22, the process goes to step S24 in FIG. 5. Conversely, if it is determined to be abnormal in step S22, the process goes to step S23 where the announcement for operator storing is made, and thereafter the connection with the switchboard is made.

In step S24 in FIG. 5, an announcement is made to request that a call-back method be specified. That is, an announcement is made for asking the specification of either an automatic call-back or a call-back by the operator. Then, a timer T2 is started, and in step S25, it is determined whether or not a PB signal was received. If the determination is positive, the process goes to step S28. On the other hand, if negative, the process branches to step S26 where the stored number J is increased by one. In step S27, it is determined whether or not J=2, and if negative, the process returns to step S24, otherwise the process goes to step S23.

In step S28, the received PB signal is analyzed, and in step S29, it is determined whether or not the PB signal was normal. If it determined to be normal, the process goes to step S30 where it is determined whether or not a call-back telephone number is already registered. If a call-back telephone number is registered, the process goes to step S36 in FIG. 6 since the procedure for specifying a call-back telephone number can be omitted. On the other hand, if it is not registered, the process goes to step S31 to enter the operation for specifying a call-back telephone number.

In step S31, an announcement asking the specification of a call-back telephone number is sent out and a timer T3 is started, and in step S32, it is determined whether or not a PB signal was received. If this determination is positive, the process goes to step S35. If negative, the process goes to step S33 where the stored number K is increased by one, and in step S34, it is determined whether or not K=2. If this determination is negative, the process returns to step S31, otherwise the process goes to step S23 (refer to FIG. 4).

Figure 6:
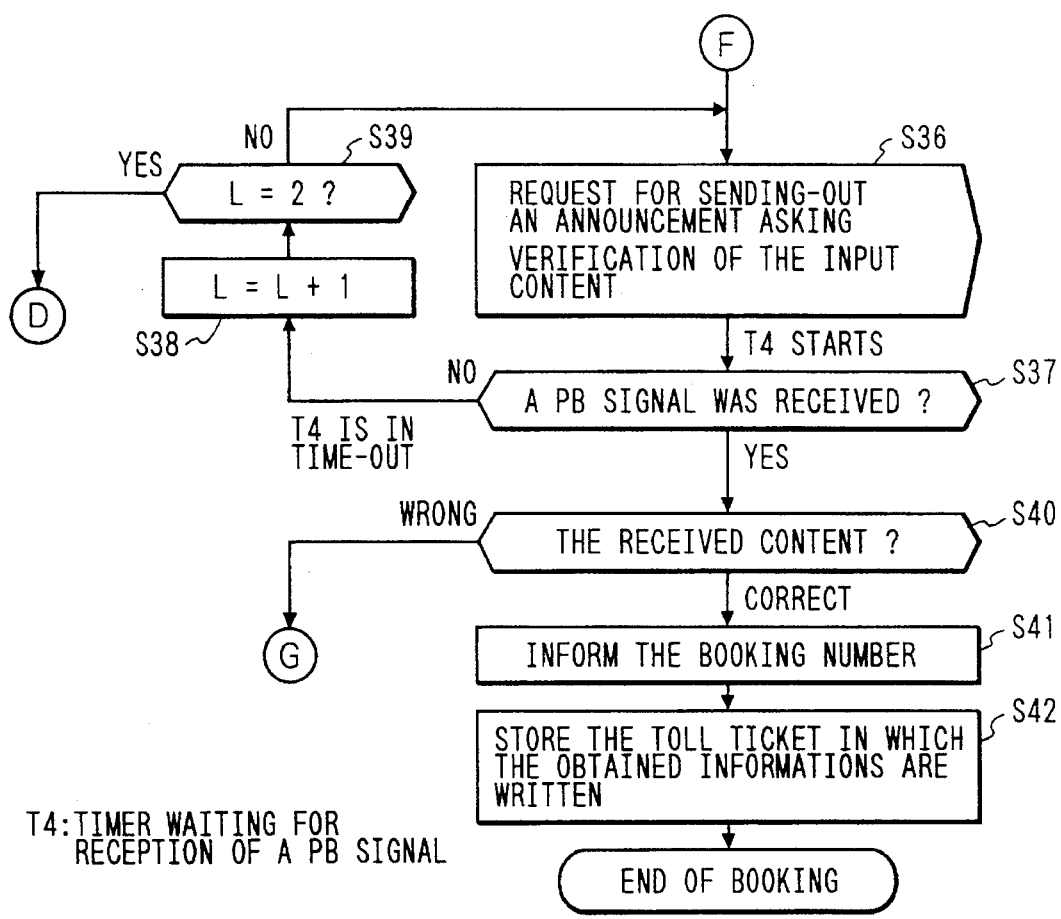

In step S36 in FIG. 6, an announcement of the input contents and an announcement of asking the confirmation of this are sent out, and a timer T4 is started. In step S37, t is determined whether or not a PB signal was input, and the process goes to step S40 if the determination is positive. On the other hand, if this determination is negative and the timer T4 is in a time-out condition, the process goes to step S38 to increase L by one. In step S39, whether or not L=2 is determined, and the process returns to step S36 if the determination is negative, and goes to step S23 (refer to FIG. 4) if positive.

In step S40, the received content is determined. For instance, if the content is "1#", it is determined to be correct, otherwise it is determined to be wrong. When it is determined to be correct, the process goes to step S41 to inform the calling party of a booking number. Then, in step S42, a toll ticket in which the received information is written is stored. On the other hand, it is determined in step S40 that the input is not "1#", the process returns to the step S16 (refer to FIG. 4) to repeat the above processings. In this case, an operator connective service may be chosen.

By the above procedure, the booking operation is completed. Incidentally, in the above described flowcharts, it is determined in step S1 whether or not the utilization of services has been registered in the telephone number verification system 22, but this procedure is not always necessary and may be omitted.

Figure 7:
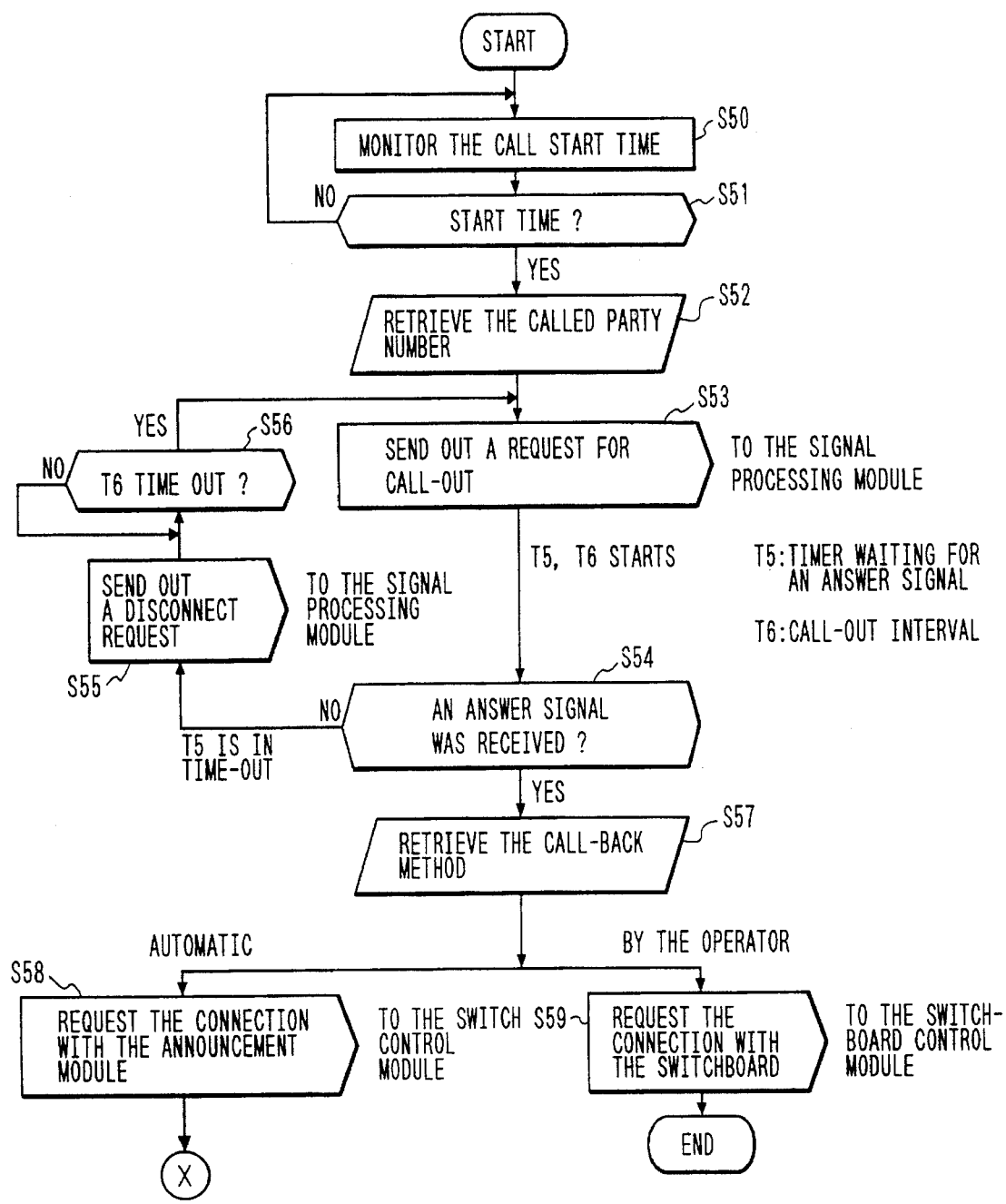

The calling operation of the booking control module 29 after a call is booked is now described with reference to the flowcharts of FIGS. 7 and 8.

In step S50, the call start time is monitored, and in step S51, it is determined whether or not the call start time has been reached. If this determination is positive, the process goes to step S52 to retrieve the number of the called party. Then, in step S53, a call-out request is sent out to the signal processing module 27. Subsequently, timers T5 and T6 are started, and in step S54, it is determined whether or not an answer signal was received. The timer T5 is an answer signal waiting timer, and the T6 timer is a call-out interval timer.

If this determination becomes positive, the process goes to step S57. If no response signal was received even in the case of time-out of the timer T5, the process goes to step S55 to send out a disconnect request to the signal processing module 27. In step S56, it is determined whether or not the timer T5 is in a time-out condition, and if the determination becomes positive, the process returns to step S53 to make a call-out request again. In addition, this step may be changed to so that the repetition of the operation is performed, for instance, three times, and if there is still no response from the called party, the calling to the called party is stopped and subjected to the handling by the operator, and the operator informs the calling party of such effect.

In step S57, the call-back method is retrieved, and for the automatic call-back, the process goes to step S60 through step S58. On the other hand, for the call-back by the operator, the process goes to step S59 where a switch-board connective request is sent out to the switchboard control module 24. Thereafter, the calling party is called by the switchboard.

In step S60 in FIG. 8, an announcement is made to the called party from the announcement module 26 to the effect that the calling party is being called, and in step S61, the number of the calling party is retrieved. In step S62, a request for connection to the calling party is issued the signal processing module 27. Then, a timer T7 is started, and it is determined in step S63 whether or not there is an answer signal from the calling party. If there is the answer signal, the process goes to step S64 to issue a channel connective request to the switch control module 21.

On the other hand, if there is no response from the calling party even in the case of time-out of the timer the process goes to step S65, where the announcement module 26 is requested to send out an announcement that there is no response from the calling party. This announcement of no response from the calling party is communicated to the called party. Then, in step S66, a disconnect request is sent out to the signal processing module 27. As a result, the circuit with the called party is disconnected.

As described above, in accordance with the present embodiment, the operation can be implemented in which when a calling party makes a call-out for an international direct dialing and the circuit is not promptly connected with the called party, or when the circuit is connected and there is no response from the called party, the international transit switch stores the call of the calling party and connects called party with the calling party at the time specified by the calling party.

Figure 9:
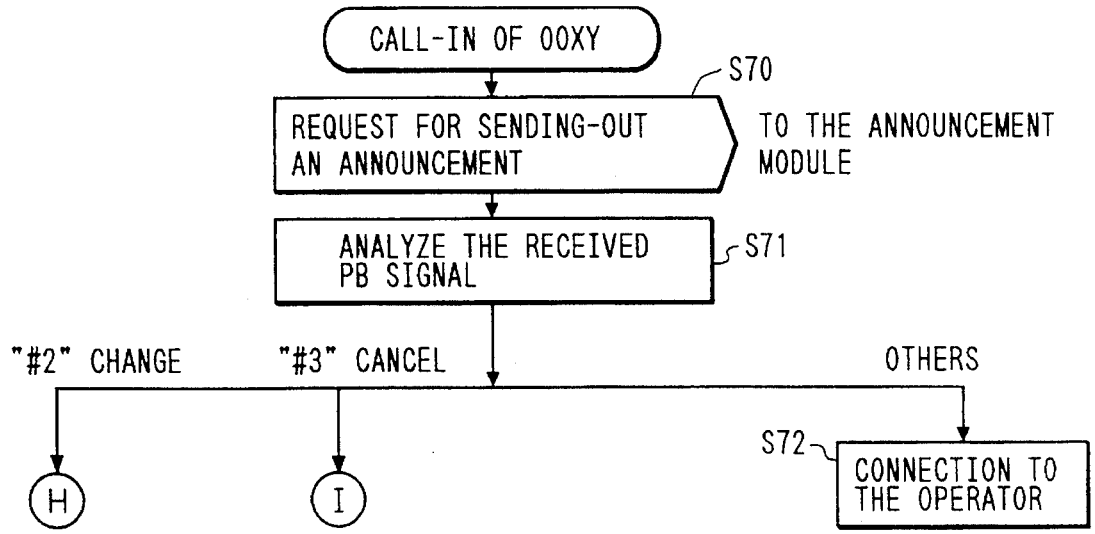
FIGS. 9 to 11 are flowcharts showing the operation of changing or canceling the contents of the international direct dialing booking.
Figure 10:
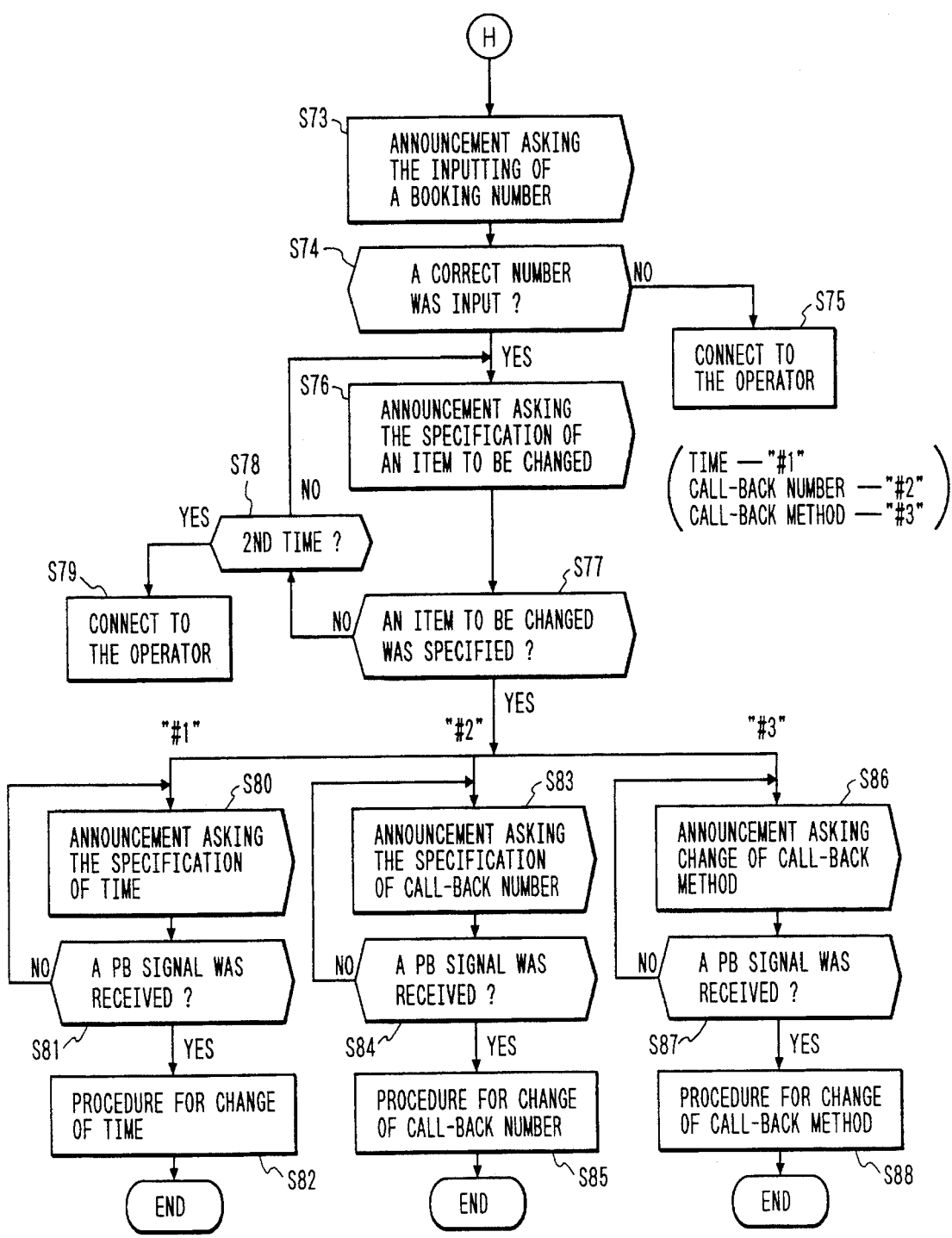
Figure 11:
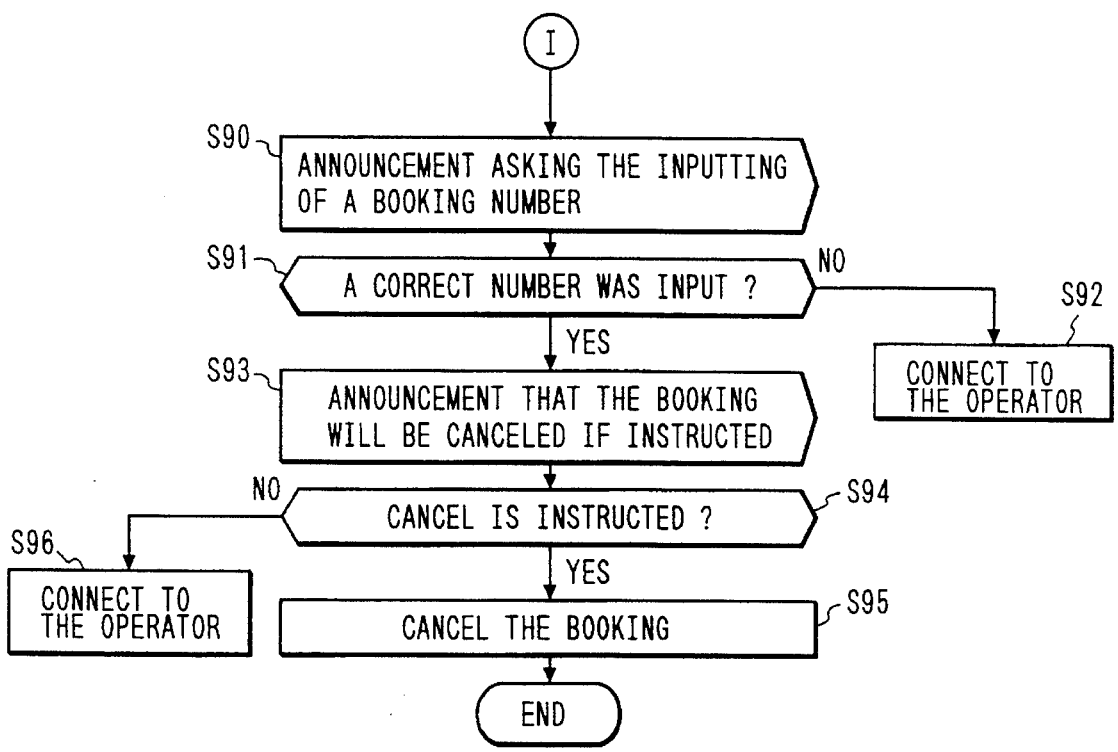
Figure 16:
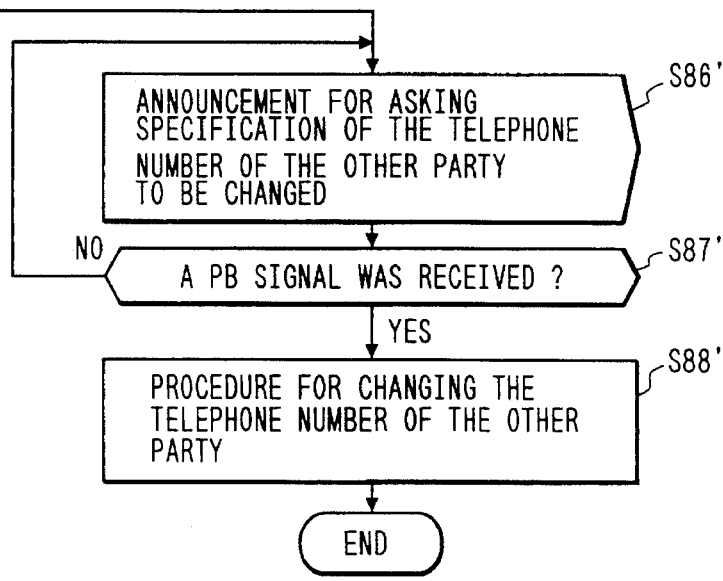
FIG. 16 is a flowchart showing part of the operation of changing the contents of the booking.

Now, with reference to FIGS. 9 to 11, description is made to a procedure in which, after the calling party makes a procedure with the international transit switch fop storing his call and before the call start time specified in the international transit switch comes, the storing of the call is canceled of the call-back number of the calling party is changed.

When a number "00XY", a number fop accepting change, cancel of the like of a booking, is called in, the booking control module 29 accepts this, and in step S70, send out an announcement to the effect that change of cancel of a booking can be accepted and the specification of either of them is waited. In step S71, the received PB signal is analyzed, and the process goes to step S73 in FIG. 10 if the result is "#2", a number representing change. On the other hand, if it is "#3" representing cancel of a booking, the process goes to step S90 in FIG. 11. Further, if it is other number, the process goes to step S72 to connect the circuit with the operator.

In step S73 in FIG. 10, an announcement fop requesting the inputting of the booking number is transferred to the telephone 1. If it is determined that the correct number was input in step S74, the process goes to step S76. If the correct number was not input, the process goes to step S75 to connect the circuit with the operator. In this case, it is also possible to request that the booking number be input again, and submit to the handling by the operator if there is still no inputting of the correct number.

In step S76, an announcement asking the specification of an item to be changed is made. In step S77, when an item to be changed is specified from the calling party by a PB signal, the PB signal is analyzed, and the process goes to step S80 if it is "#1". The process goes to step S83 if "#2", and step S86 if "#3". On the other hand, if no item is specified for change when a predetermined time is elapsed, the process goes to step S78 to determine whether or not it is the second time, and if not, the process returns to step S76 to make the announcement again. If it is determined to be the second time in step S78, the process goes to step S79 to connect the circuit with the operator.

In step S80, an announcement asking the inputting of time to be changed is made, and if the calling party inputted in step S81, the process goes to step S82 to perform a time change procedure. In step S83, an announcement asking the specification of a call-back number to be changed is made. If a PB signal was received in step S84, the process goes to S85 to perform a call-back number change procedure. Further, in step S86, an announcement asking the specification of a call-back method to be changed is made. If a PB signal is received in step S87, the process goes to step S88 to perform a call-back method change.

Then, in steps S90 to S92 in FIG. 11, operations same to steps S73 to S75 in FIG. 10 are performed. In step S93, an announcement is made to the effect that the booking is canceled if instructed. In step S94, it is determined whether or not a cancel was instructed, and if the determination is positive, the process goes to step S95 to cancel the booking. On the other hand, if no cancel is instructed even if a predetermined time has elapsed, the circuit is connected to the operator.

As described above, in accordance with the present embodiment, if the caller must go out for some reason after he asks a booking service, he can change the call-back time or can change the call back number to the telephone number of the place where he goes, and this is very convenient for the caller. Further, the booking can be canceled as needed, and thus the caller can go out without worry. In addition, even if someone visits him, he can receive the visitor without anxiety.

Another embodiment of the present invention is now described with reference to the flowcharts of FIGS. 12 to 18. The "booking" of the above described embodiment is a service which is provided if and after the connection of the circuit with the other party (called party) is unsuccessful, but the "booking" of the present embodiment enables the user to directly request a "booking" by calling out a predetermined dial number "00XY".

When "00XY" which is the number for direct dialing booking is called in from the telephone 1 through the local switch 2, the booking control module 29 accepts this. Then, in step S101, an announcement to the effect that a booking, or change or cancel of a booking can be accepted, and that the specification of any of them is waited for is sent out to the calling party. In step S102, the received PB signal is analyzed, and if the result is "#1" representing a booking, the process goes to step S111 in FIG. 13. On the other hand, if it is "#2" representing change of the content of a booking or "#3" representing cancel of a booking, the process goes to a step performing the corresponding processing, and if it is other number, the process goes to step S103 to connect the circuit to the operator.

Figure 13:
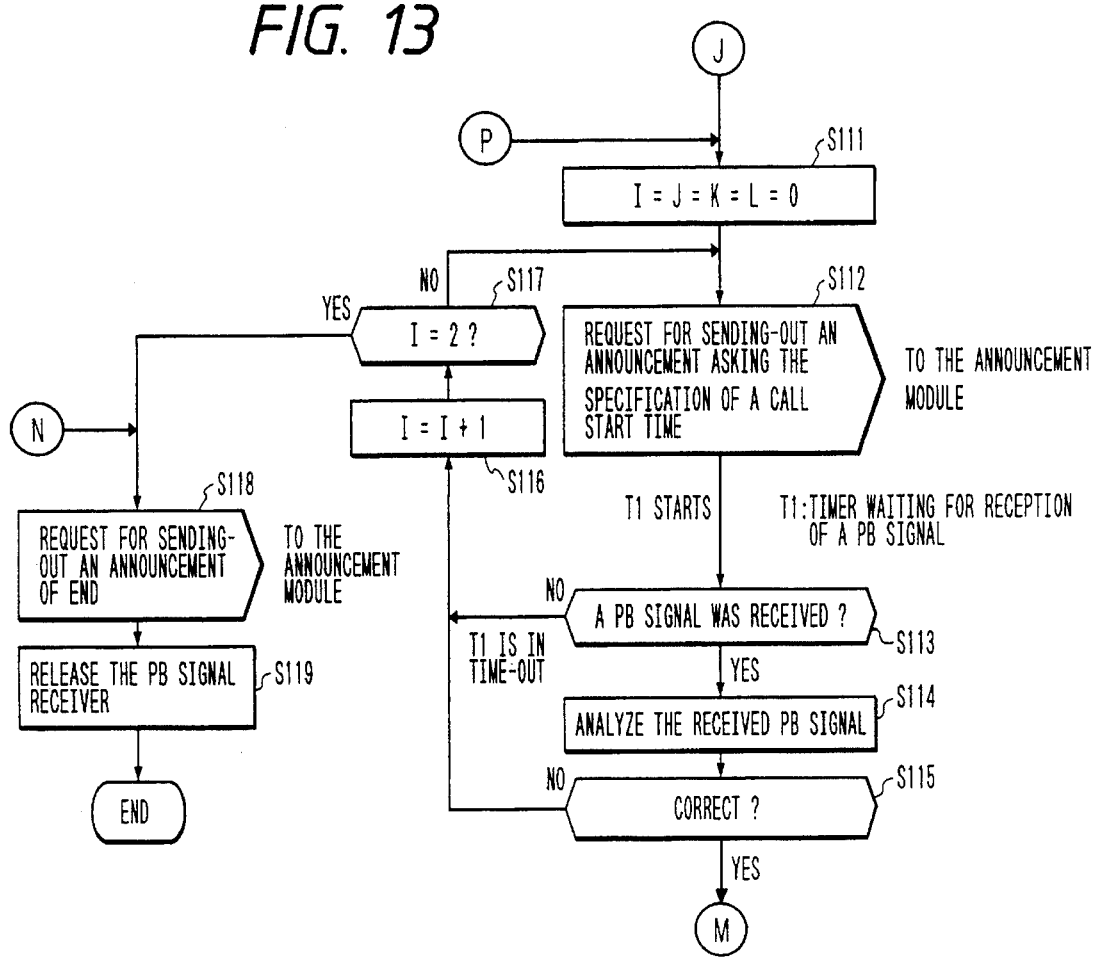
FIGS. 13 to 15 are flowcharts showing the operation of the booking.

The operation of the booking is described below with reference to FIGS. 13 to 15. In step S111 in FIG. 13, stored numbers I, J, K and L, for instance, in a certain register in the booking control module 29 is set to zero. In step S112, the booking control module 29 requests the switch control module 21 to connect the announcement module 26 to the channel, and instructs the announcement module 26 to make an "announcement asking the specification of a call time" to the telephone 1. Then, the booking control module 29 starts a timer T1. In step S113, the PB signal receiver 28 determines whether or not it received a PB signal. If it received a PB signal, the process goes to step S114 to analyze the received PB signal.

If no PB signal was received even in the case of time-out of the timer T1 (step S113 is negative), or if the received PB signal is not correct (step S115 is negative), the process goes to step S116 to increase the stored number I by one. In step S117, it is determined whether or not I=2, and if this determination is negative, the process returns to step S112, where an announcement is made again from the announcement module 26 to the effect that the specification of a call start time is waited for.

If the determination in step S117 becomes positive, the process goes to step S118 to make an announcement of stopping the booking, and in step S119, the PB signal receiver 28 is released from the channel and the unsuccessful booking procedure ends. In addition, in step S118, for instance, an announcement may be made to the effect that the circuit is connected to the switchboard for the storing by the operator, and the call may be handled by the operator.

Figure 14:
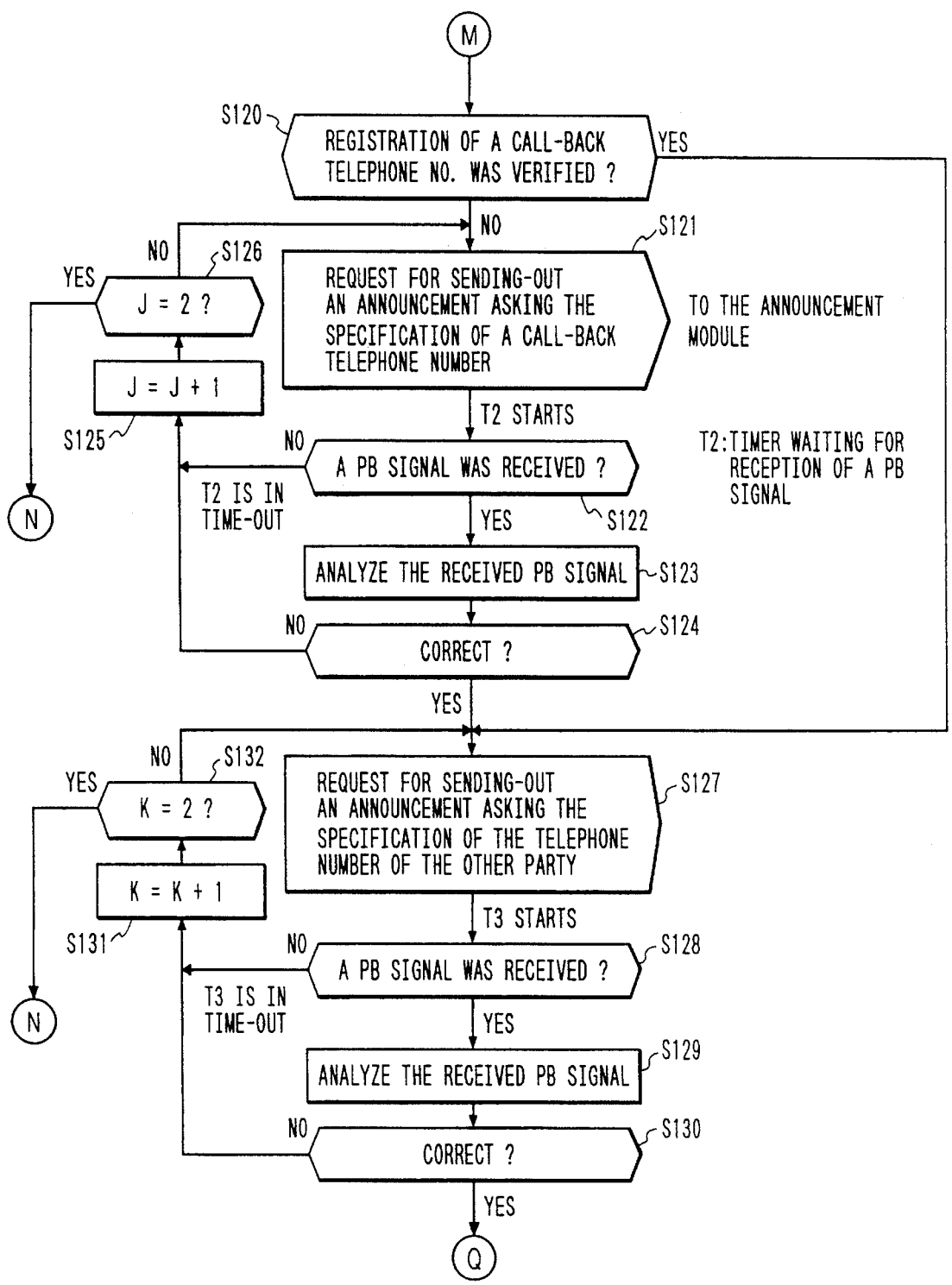

If the determination in step S115 is positive, the process goes to step S120 in FIG. 14. In step S120, it is determined whether or not a call-back telephone number is registered. If a call-back telephone number is registered, the process skips to step S127 since the procedure for specifying a call-back telephone number can be omitted. On the other hand, if it is not registered, the process goes to step S121 to enter the operation for specifying a call-back telephone number.

In step S121, an announcement requesting the specification of a call-back telephone number is made, and a timer T2 is started. Then, in step S122, it is determined whether or not a PB signal was received, and if a PB signal was received, the process goes to step S123 to analyze the received PB signal. If no PB signal was received even in the case of time-out of the timer T2 (step S122 is negative), or if the received PB signal is not correct (step S124 is negative), the process goes to step S125 to increase J by one. In step S126, it is determined whether or not J=2, and if the determination is negative, the process returns to step S121 to make the announcement asking the specification of a call-back telephone number again. If the determination in step S126 becomes positive, the process goes to step S18, where announcement is made to the effect the booking ends and the booking procedure is stopped. In step S119, the PB signal receiver is released from the channel and the process ends.

Then, in steps S127 to S132, a procedure for specifying the telephone number of the called party is executed. The explanation of this procedure is omitted since it is identical to the steps S112 to S117 and S121 to S126.

Figure 15:
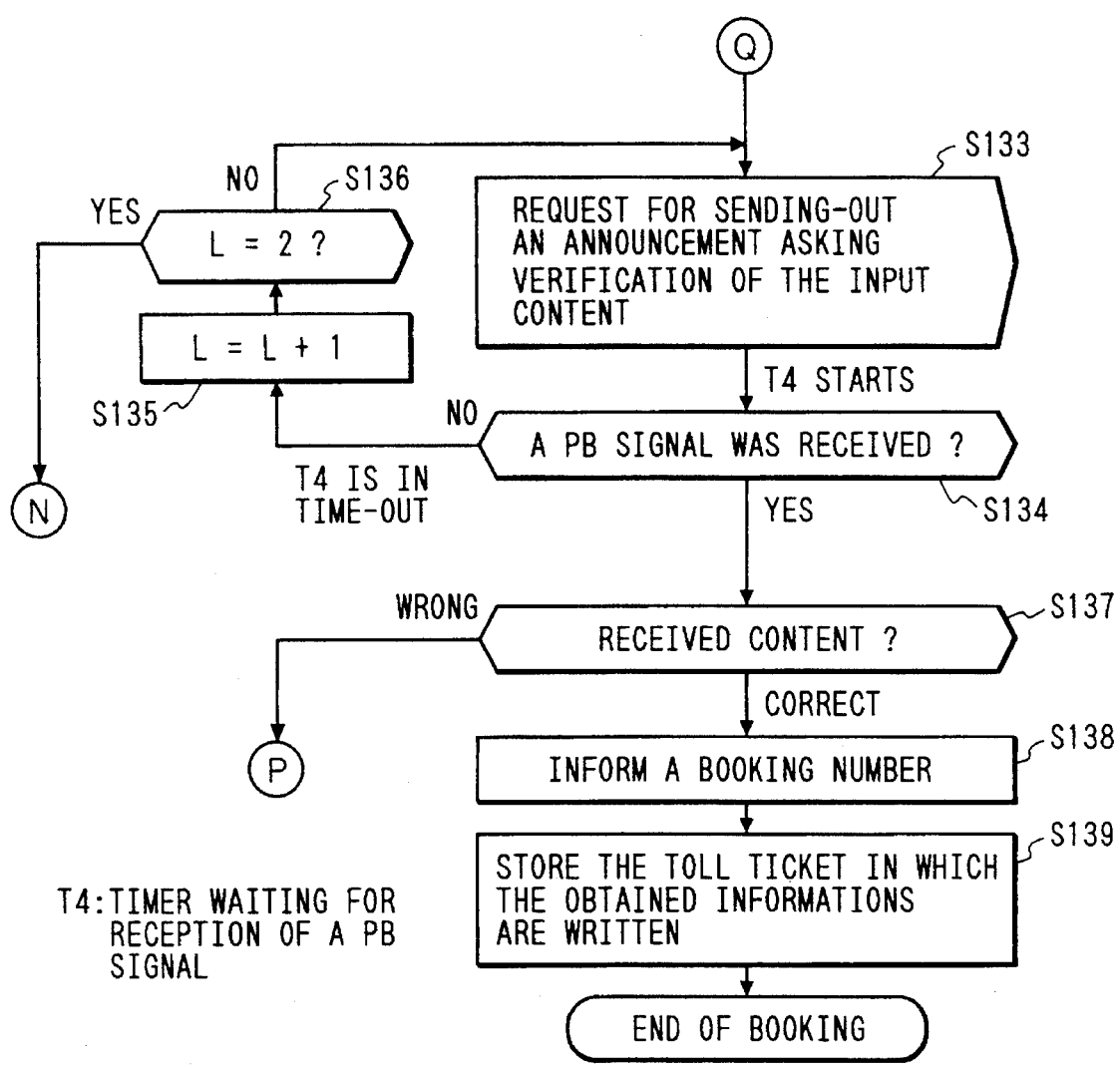

In step S133 in FIG. 15, an announcement of the content of the input and asking the verification of it are sent out, and a timer T4 is started. In step S134, it is determined whether or not a PB signal was input, and if this determination is positive, the process goes to step S137. On the other hand, if this determination is negative and the timer is in a time-out condition, the process goes to step S135 to increase L by one. In step S136, it is determined whether or not L=2, and the process returns to step S133 if this determination is negative. If positive, the process goes to step S118 (refer to FIG. 13).

In step S137, the received content is determined. If the received content is, for instance, "1#", it is determined to be correct, and the process goes to step S138 to inform the calling party of the booking number. In step S139, a toll ticket in which the obtained information is written is stored. On the other hand, if it is determined in step S137 that the input is other than. "1#", the process returns to the step S111 (refer to FIG. 13) to repeat the above described processing. Instead of this, the connection may be entrusted to the operator. With above procedure, the booking operation ends.

Figure 12:
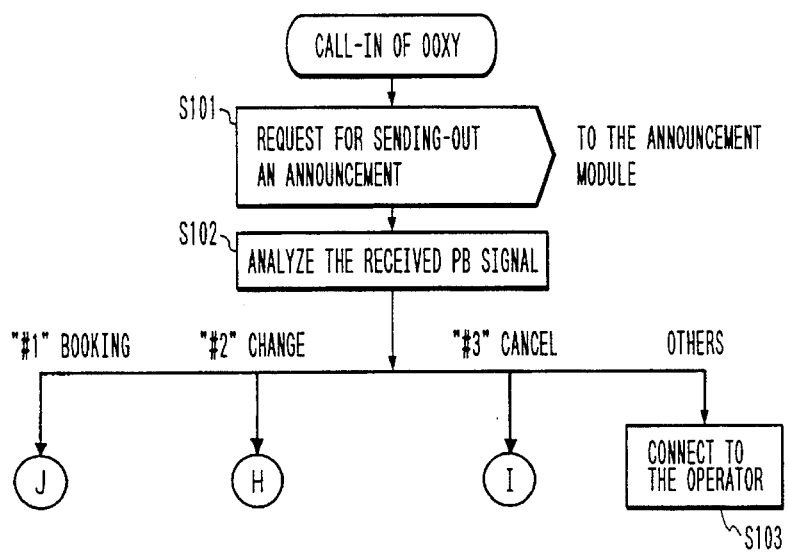
FIG. 12 is a flowchart showing the operation of the time of call-in in the booking of the second embodiment.

If it is determined in step S102 in FIG. 12 that the received signal is "#2", the process enters the operation for accepting a change of the content of the booking (change of the time, change of the call-back number, change of the telephone number of the called party). This operation is identical to FIG. 10 except that "#3" in step S76 in FIG. 10 is altered from "call-back method" to "change of the telephone number of the called party" and the processings in steps S86 to S88 are changed. Accordingly, only the portion corresponding to the steps S86 to S88 is described with reference to FIG. 16, and the description of the processings in the remaining portions are omitted.

If "#3" is input from the calling party in response to the request for specifying an item to be changed in step S76, the process goes to step S86' to proceed to the operation for changing the telephone number of the other party. In step S86', an announcement is made to the effect that asking specification of the telephone number of the other party to be changed. If, in step S87', a PB signal representing the telephone number of a new called party is received, the process goes to step S88' to perform the procedure for changing the telephone number of the called party to the new one.

Then, if the received PB signal is determined to be "#3" in step S102 in FIG. 12, the operation for canceling the once accepted booking is performed. The description of this operation is omitted since it is identical to the steps S90 to S96 in FIG. 11.

Figure 18:
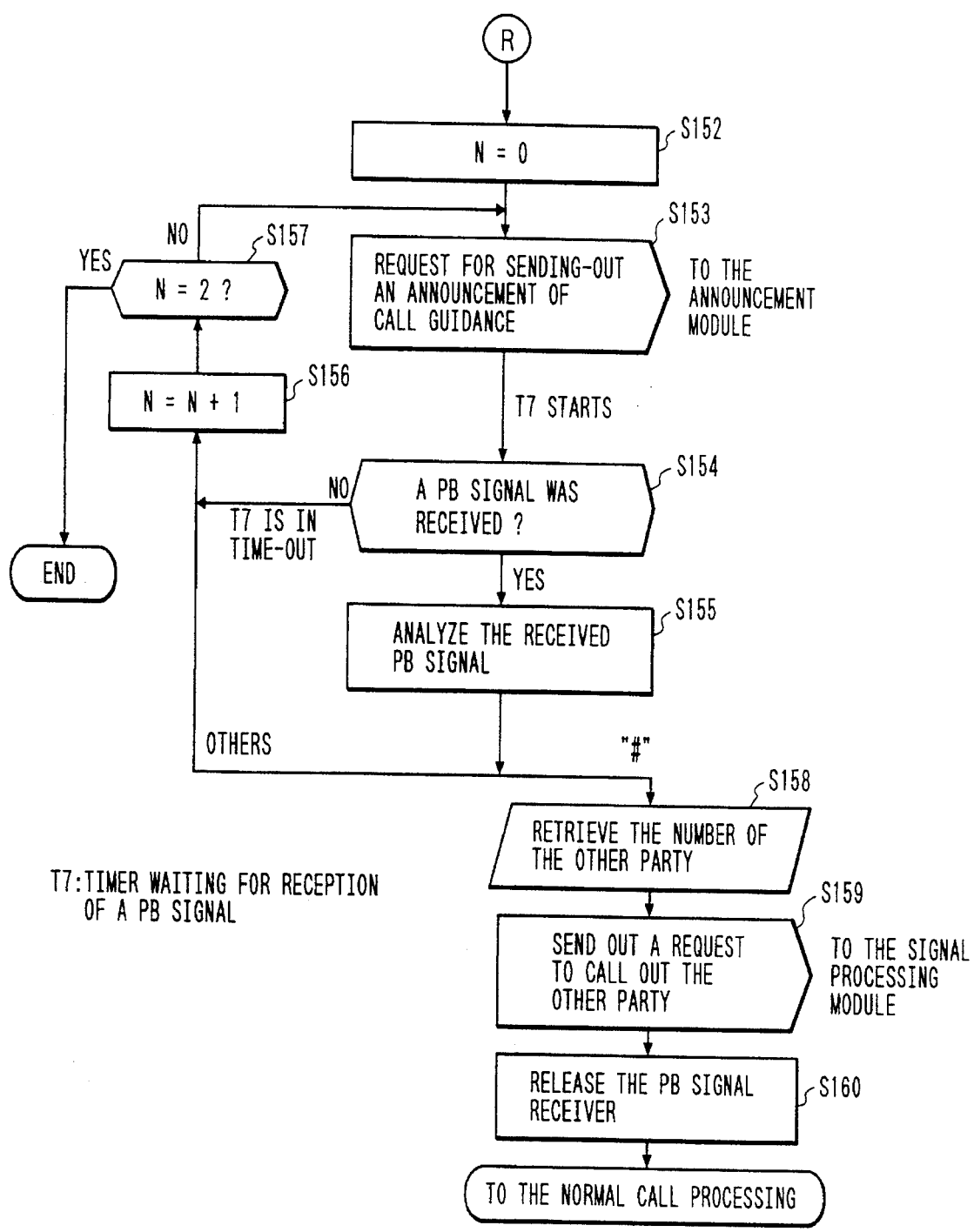

The operation of the international transit switch after the booking is now described with reference to the flowcharts of FIG. 17 and 18.

In step S141, the call start time is monitored, and in step S142, it is determined whether or not the call start time is reached. If this determination is positive, the process goes to step S143 to retrieve the number of the calling party. Then, in step S144, a call-out request is sent out to the signal processing module 27. Subsequently, a timer T5 is started, and in step S145, it is determined whether or not an answer signal was received. The timer T5 is a timer for waiting for an answer signal.

If this determination becomes positive, the process goes to step S150. If no response signal was received even in the case of time-out of the timer T5, the process goes to step S146 to send out a disconnect request to the signal processing module 27. By this, the circuit is temporarily disconnected. In step S147, it is determined whether or not a timer T6 for measuring the call interval is in a time-out condition, and if the determination becomes positive, the process goes to step S148 to increase a certain stored number M by one. In step S149, it is determined whether or not M=2, and if this determination is negative, the process returns to step S144 to repeat the above described operation. On the other hand, if positive, it means that the calling party does not respond, and thus assuming that the booking was canceled, the operation ends.

In step S150, a request is issued for connecting the announcement module 26 with the calling party, and in step S151, the PB signal receiver 29 is connected to the channel. In step S152 in FIG. 18, N=0 is set, and in step S153, an announcement for call guidance is sent out to the effect that the operation for calling the called party will be performed and the calling party is asked to press the "#"-button if ready. Subsequently, a timer T7 is started, and in step S154, it is determined whether or not a PB signal was received. If this determination becomes positive, the process goes to step S155. On the other hand, if no PB signal was received even in the case of time-out of the timer T7, a stored number N is increased by one in step S156, and in a step S157, it is determined whether or not N=2 was satisfied. If the determination is negative, the process returns to step S153. If the determination in step S157 is positive, the process ends.

In step S155, the received PB signal is analyzed, and it is detected that the PB signal is "#", the process goes to step S158 to retrieve the number of the called party. In step S159, a call-out request to the called party is sent out to the signal processing module 27, and in step S160, the PB signal receiver 29 is released from the channel. Thereafter, the normal call processing is performed.

As described above, in accordance with the present embodiment, if the calling party makes a booking by an international direct dialing, the international transit switch automatically calls the calling party at the booked time and calls out the called party. For this, the calling party need not handle the telephone number of the called party, and thus there is a merit that the operability increases and the possibility of wrong dialing is eliminated. Also, there is no fear of forgetting to call the other party. In addition, the calling party need not care about the time difference between the other party, and thus the mental burden of the calling party can be eased.

What is claimed is:

1. An international direct dialing booking system comprising:

means for performing a booking procedure when there is a call-in of an access number for booking by an international direct dialing made by a calling party and a signal receiver receives a predetermined signal from the calling party providing an input;

means for selectively one of changing and cancelling the input accepted by the means for performing the booking procedure;

announcement means for requesting with an automatic announcement whether the input is to be one of changed and cancelled and for accepting a response;

means for connecting to an operator if the response to announcement means is not one of changed and cancelled;

means for calling the calling party at the call time registered by the means for performing the booking procedure; and means for calling a called party when there is a response from the calling party, wherein the input accepted by the means for performing the booking procedure can be one of changed and cancelled.

2. An international direct dialing booking system of claim 1 wherein one of a call-back time and a call-back number can be selectively changed.

3. An international direct dialing booking system comprising:

means for connecting a channel to a called party specified by the international direct dialing made by a calling party when there is a call-in of the international direct dialing;

a signal receiver connected to the channel;

means for performing a booking procedure and accepting a an input when the signal receiver receives a predetermined signal from the calling party after the channel to the called party do not connect for a predetermined time;

means for selectively one of changing and cancelling the input accepted by the means for performing the booking procedure;

announcement means for requesting with an automatic announcement whether the input is to be one of changed and cancelled and for accepting a response;.

means for connecting to an operator if the response to announcement means is not one of changed and cancelled;

means for calling the called party at a called time registered by the booking procedure;

means for calling the calling party when there is a response from the called party; and wherein even when the calling party calls in, the call by the calling party is temporarily kept when the circuit connection with the called party is unsuccessful and the input accepted by the means for performing the booking procedure can be selectively one of changed and cancelled.

4. An international direct dialing booking system of claim 3 wherein one of a call-back time and a call-back number can be selectively changed.

* * * * *